US009126555B2

United States Patent
Ver Hoven et al.

(10) Patent No.: US 9,126,555 B2
(45) Date of Patent: Sep. 8, 2015

(54) REDUCED WIDTH LINEAR PRETENSIONER FOR MOTOR VEHICLE SEATBELT RESTRAINT SYSTEMS

(71) Applicant: Autoliv ASP, Inc., Ogden, UT (US)

(72) Inventors: Robert E. Ver Hoven, Harsens Island, MI (US); Timothy J. Cahill, Dryden, MI (US); Jon E. Burrow, Ortonville, MI (US); Matthias Bäker, Hamburg (DE)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/210,834

(22) Filed: Mar. 14, 2014

(65) Prior Publication Data

US 2014/0265290 A1   Sep. 18, 2014

Related U.S. Application Data

(60) Provisional application No. 61/793,485, filed on Mar. 15, 2013.

(51) Int. Cl.
*B60R 22/195* (2006.01)
*B60R 22/18* (2006.01)

(52) U.S. Cl.
CPC ............. *B60R 22/1954* (2013.01); *B60R 22/18* (2013.01); *B60R 22/1955* (2013.01); *B60R 2022/1818* (2013.01)

(58) Field of Classification Search
CPC ............. B60R 22/195; B60R 22/1952; B60R 22/1955; B60R 2022/1818; B60R 22/18; B60R 22/1954
USPC ........................................... 280/806; 297/480
See application file for complete search history.

(56) References Cited

U.S. PATENT DOCUMENTS

| | | | | |
|---|---|---|---|---|
| 3,811,703 | A * | 5/1974 | Turkovich | 297/474 |
| 5,735,479 | A * | 4/1998 | Sasaki et al. | 242/377 |
| 6,036,274 | A * | 3/2000 | Kohlndorfer et al. | 297/480 |
| 6,068,664 | A | 5/2000 | Meyer et al. | |
| 6,199,954 | B1 * | 3/2001 | Holzapfel | 297/479 |
| 6,561,936 | B1 * | 5/2003 | Betz et al. | 474/110 |
| 6,871,877 | B2 * | 3/2005 | Herrmann et al. | 280/805 |
| 7,338,083 | B2 * | 3/2008 | Sakata | 280/806 |
| 7,364,201 | B2 * | 4/2008 | Lutz et al. | 280/806 |
| 7,823,924 | B2 | 11/2010 | Dewey et al. | |

* cited by examiner

*Primary Examiner* — Ruth Ilan
*Assistant Examiner* — Timothy Wilhelm
(74) *Attorney, Agent, or Firm* — Brinks Gilson & Lione (57) ABSTRACT

A guide that can be included as part of a pretensioner for a motor vehicle belt restraint system. The pretensioner includes a frame having walls that define an interior compartment. Located within the interior compartment is a piston assembly having a gas generator in communication with a piston. The gas generator creates an expanding gas that causes movement of the piston and applies tension to a seatbelt of the belt restraint system. The guide includes an opening through which the seatbelt passes and that causes the seatbelt to form a reduced width configuration upon exiting the guide.

20 Claims, 5 Drawing Sheets

REDUCED WIDTH LINEAR PRETENSIONER FOR MOTOR VEHICLE SEATBELT RESTRAINT SYSTEMS

CROSS REFERENCE TO RELATED APPLICATION

This application claims the benefit of U.S. provisional patent application No. 61/793,485, filed Mar. 15, 2013, the entire contents of which are herein incorporated by reference.

BACKGROUND

1. Field of the Invention

The present invention generally relates to seatbelt restraint systems for motor vehicles. More particularly, the present invention relates to a linear pretensioner of a seatbelt restraint system in a motor vehicle.

2. Related Technology

Seatbelt restraint systems used for restraining occupants in motor vehicle seats play an important role in reducing injury to the occupants in the unfortunate event of a vehicle crash. While there are several varieties of seatbelt restraint systems, the conventional "3-point" variety commonly has a lap belt section extending across the pelvis and a shoulder belt section crossing the upper torso of a seated occupant. The lap and shoulder belt sections are each connected to the vehicle structure by anchorages and may be further fastened to each other or formed as portions of a continuous length of seatbelt webbing. Seatbelt restraint systems that are manually secured by the occupant ("active" types) also typically include a latch plate attached to the belt webbing. Such a system further includes a seatbelt buckle attached to the vehicle body structure by another anchorage. The latch plate is received by the buckle thereby allowing the seatbelt restraint system to be fastened, enabling restraint, and unfastened, allowing entrance and exit from the vehicle. Of the anchorages securing the lap and shoulder belt sections, one anchorage typically includes a belt retractor to store the belt webbing. This belt retractor may further act to manage belt tension loads during a crash situation. Seatbelt restraint systems, when deployed, effectively restrain the occupant during a collision.

OEM (Original Equipment Manufacturer) vehicle manufacturers often provide seatbelt restraint systems with pretensioning devices (usually referred to just as a "pretensioner"). These devices induce tension in the seatbelt, either prior to impact of the vehicle during a collision or at an early stage of a sensed impact/collision, so as to enhance occupant restraint performance. This pretensioning takes slack out of the webbing and permits the seatbelt restraint system to engage the occupant earlier in the crash sequence.

One class of pretensioning devices is a pyrotechnic linear pretensioner (PLP). A PLP can be implemented as a pyrotechnic buckle pretensioner (PBP) that is attached to and activated through the seatbelt buckle. In other implementations, the PLP can be attached to a webbing guide loop, either anchorage connected to the opposing ends of the seatbelt webbing or directly to the webbing itself. Since all of the above types of pretensioners linearly pull a seatbelt system component to induce tension in the seatbelt webbing, they are collectively referred to as PLPs.

When a collision occurs, a pyrotechnic charge in the PLP is fired, producing an expanding gas that pressurizes a gas chamber. This pressure forces a piston to move. The piston is connected with the belt system by a cable, a strap or the webbing of the restrain system, and the stroking of the piston tightens or "pretensions" the belt against the occupant. Various examples of PLP and PBP designs are provided in U.S. Pat. Nos. 6,068,664 and 7,823,924, which are hereby incorporated by reference.

Designers of automotive components are constantly striving to reduce the mass of the components as part of the overall goal of providing higher fuel efficiency for motor vehicles. Additionally, these same designers are also constantly striving to reduce costs in automotive components. One way to achieve the above is to reduce packaging or sizing of components.

In accordance with one known design approach, the PLP includes a machined or die cast piston that is coupled to a tubular combustion cylinder. When activated, the piston is sealingly guided along the combustion cylinder. The belt webbing is wound around an actuating profile of the piston such that the length of the belt webbing is shortened by a distance corresponding to twice the distance of the piston stroke. This doubling of the effect of the piston stroke on the belt webbing enables the overall length of the PLP packaging to be shortened. The ability to reduce the width of the packaging would also aid in reducing dimensional sizing of the PLP.

SUMMARY

In satisfying the above needs, as well as overcoming the enumerated drawbacks and other limitations of the related art, in one aspect the present invention provides a guide for passing a webbing therethrough and folding a lateral side of the webbing back upon a central portion of the webbing, wherein the guide comprises a body having an opening defined therethrough from an entrance on one side of the body to an exit on an opposing side of the body, the opening defined by interior surfaces extending between the entrance and the exit, the interior surfaces defining a shape wherein the entrance has an entrance area that is larger than an exit area defined by the exit.

In another aspect of the invention, the opening of the seatbelt guide includes an upper wall, a lower wall and opposed sidewalls generally forming a flattened funnel shape proceeding from the entrance to the exit.

In another aspect of the invention, the lower wall is formed with a fin projecting toward the upper wall.

In another aspect of the invention, the fin extends perpendicularly relative to the lower wall.

In another aspect of the invention, the fin extends obliquely relative to the lower wall.

In another aspect of the invention, the opposed side walls are asymmetrically shaped.

In another aspect of the invention, the opposed side walls are symmetrically shaped.

In another aspect of the invention, the opposed sidewalls include shoulders formed therein and extending longitudinally in the opening, the shoulders defining a reduced region between the opposed sidewalls.

In another aspect of the invention, adjacent to the entrance the opposed side walls include portions formed without shoulders.

In another aspect of the invention, the opening defines a funnel shape.

In another aspect of the invention, the opening defines a flattened funnel shaped.

In another aspect of the invention, pretensioner is provided for use as part of a motor vehicle belt restraint system; the belt restraint system being of the type mountable to a structure of the motor vehicle. The pretensioner includes a frame having walls defining an interior compartment. A piston assembly, located within the interior compartment, is in communication with a gas generator that is fixedly positioned relative to the frame. The piston, however, is movably mounted with respect to the frame. An expanding gas created by the gas generator causes movement of the piston and generates tension on a seatbelt. A seatbelt guide is mounted to the frame and includes an opening defined through the guide from an entrance to an exit. The opening has interior surfaces, extending between the entrance and the exit, that define a shape such that an entrance area is larger than an exit area. The seatbelt extends into through the entrance and out of the exit whereafter it extends about the piston. The seatbelt further has a first width before extending into the entrance and has a second width after extending out of the exit, with the second width being less than the first width.

In another aspect of the invention, a lateral side of the seatbelt is folded under a central portion of the seatbelt where the seatbelt extends out of the exit.

In another aspect of the invention, at least a portion of the seatbelt is folded back upon itself as it extends about the piston.

In another aspect of the invention, the opening of the seatbelt guide includes an upper wall, a lower wall and opposed sidewalls generally forming a flattened funnel shape proceeding from the entrance to the exit, the lower wall having a fin projecting toward the upper wall and the fin extending one of perpendicularly or obliquely relative to the lower wall.

In another aspect of the invention, the opposed side walls are one of asymmetrically or symmetrically shaped.

In another aspect of the invention, the opposed sidewalls include shoulders formed therein and extending longitudinally in the opening, the shoulders defining a reduced region between the opposed sidewalls.

In another aspect of the invention, adjacent to the entrance the opposed side walls include portions formed without shoulders.

In another aspect of the invention, the opening defines a funnel shape.

In another aspect of the invention, the opening defines a flattened funnel shaped.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION

A representative seatbelt restraint system that may be used with a pretensioner incorporating principles of the present invention generally includes a seatbelt that is mounted to a body structure of the motor vehicle. One end of the seatbelt is preferably connected to a retractor that operates to retract the seatbelt, both when in use and when not in use. The seatbelt includes a lap belt section and a shoulder belt section. The lap belt section, when deployed, extends across the pelvic region of an occupant sitting on the seat of the motor vehicle. The shoulder belt section extends laterally across the upper torso region of the occupant. The lap belt section and the shoulder belt section may be joined together at a respective end of each section or be provided as portions of continuous seatbelt webbing.

Provided on the seatbelt is a latch plate, which may be slidable along at least a portion of the length of the seatbelt. When the seatbelt is deployed, the latch plate generally defines the transition between the lap belt section and the shoulder belt section.

The seatbelt restraint system also includes a buckle located relative to one side of the seat. Like the seatbelt, the buckle is secured to a body structure of the vehicle. The previously mentioned latch plate is removably secured within the buckle, such that when the latch plate is engaged with the buckle, the retractor provides for retraction of the seatbelt gently against the body of the occupant. When the latch plate is released from the buckle, the retractor provides for full retraction of the seatbelt so that the seatbelt will not inhibit the ingress and egress of the occupant into and out of the vehicle.

To assist in controlling movement of the seatbelt, a guide loop is usually fixed to a vehicle door pillar, such as the B-pillar, or to the seat at approximately the shoulder height of the occupant. In some installations, the position of the guide loop may be vertically adjustable. The guide loop thus positions shoulder belt section diagonally across the shoulder and chest of a seated occupant and re-directs it back toward the retractor.

Figure 1:
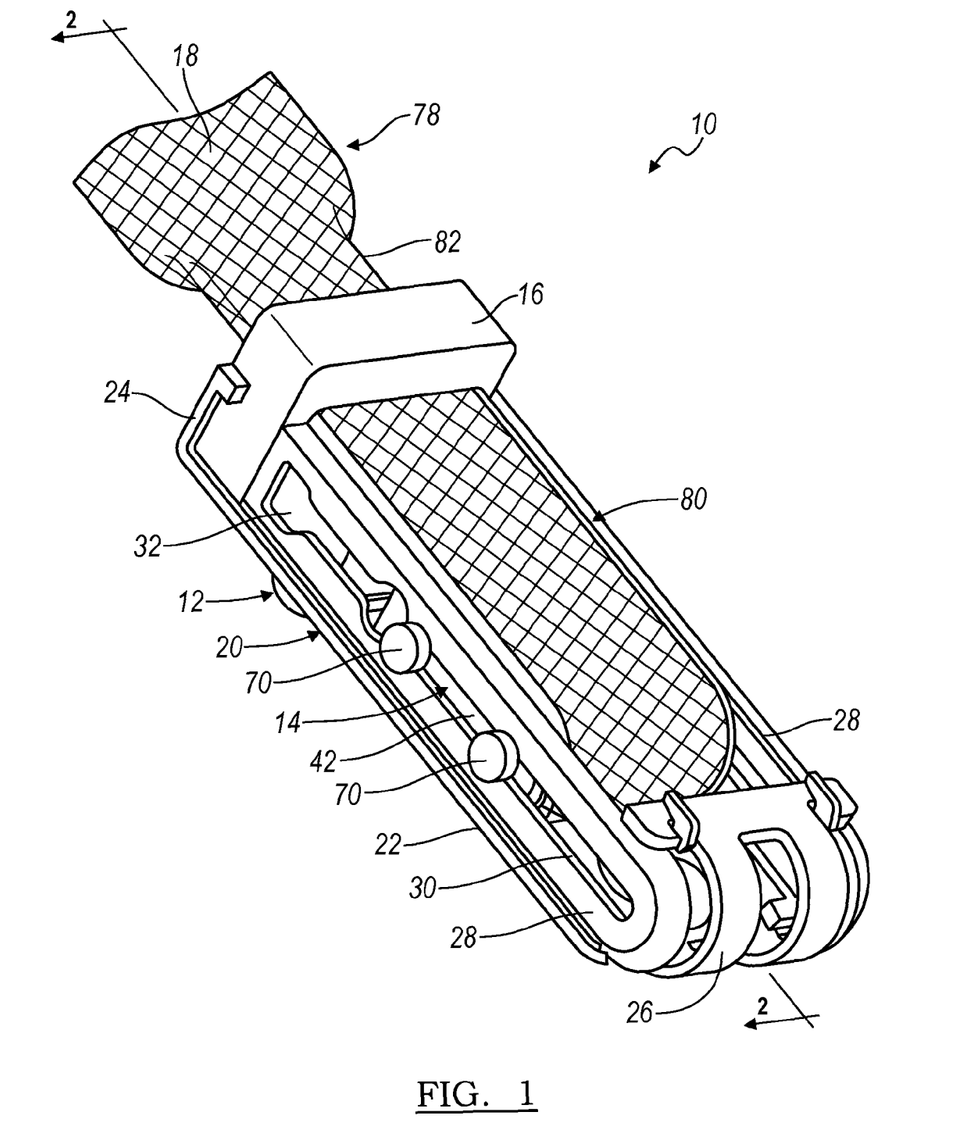
FIG. 1 is perspective view of a pretensioner in accordance with the principles of the present invention.

The seatbelt restraint system also includes a linear pretensioner. A linear pretensioner embodying the principles of the present invention is illustrated in FIG. 1 and generally designated at 10. As its primary components, the linear pretensioner 10 includes a housing or frame 12, a pyrotechnically driven piston assembly 14 and a seatbelt webbing guide 16. By way of the present invention, the seatbelt webbing guide 16 and piston assembly 14 interact with the seatbelt webbing 18 of the seatbelt restraint system to reduce the overall width of the webbing 18, thereby allowing the pretensioner 10 to be formed with a reduced width and overall packaging size.

The frame 12 of the pretensioner 10 has a base plate 20 formed of sheet metal. The base plate 20 has a profile that is approximately L-shaped with a long leg 22 extending in the axial direction, with a short leg 24 extending in a transverse direction at one end and with a curved nose 26 formed at the other end. The frame 12 further includes opposed side walls 28 that extend generally perpendicularly along the length of the long leg 22, between the short leg 24 and the nose 26. Formed in the sidewalls 28 and extending along the length thereof, are slots 30, which are used to guide portions of the piston assembly 14 as further discussed below. As so far described, is seen that the various portions of the frame 12 define an interior compartment. Within this interior compartment reside the piston assembly 14 and the webbing guide 16 mentioned above.

Mounted by suitable means within the interior compartment, generally toward the short leg 24, the piston assembly 14 includes a block 32 with a central axial bore 34. Toward one axial end of the block 32, the bore 34 has a first widening portion that accommodates a micro-gas generator 36. A second widening portion, at the opposing end of the block 32, serves as a passageway for receiving a hollow cylinder 38 that is press fitted into the second widening portion of the bore 34. The first widening portion communicates with the second widening portion of way of a reduced diameter passageway 40. Accordingly, the reduced diameter of the passageway 40 and the increased diameters of the first and second widening portions define abutments that limit the axial insertion of the micro-gas generator 36 and the cylinder 38 into the central bore 34 of the block 32.

The cylinder 38 accommodates a piston 42 that is configured to slide within the cylinder 38 in a direction away from the micro-gas generator 36. The piston 42 extends for most of the length of the cylinder 38 and protrudes from the cylinder 38 and defines an enlarged actuating profile 44. The actuating profile 44 further defines a semi-cylindrical end surface 46 having it cylindrical axis extending in a direction that is transverse to the axis of the cylinder 38.

Figure 2:
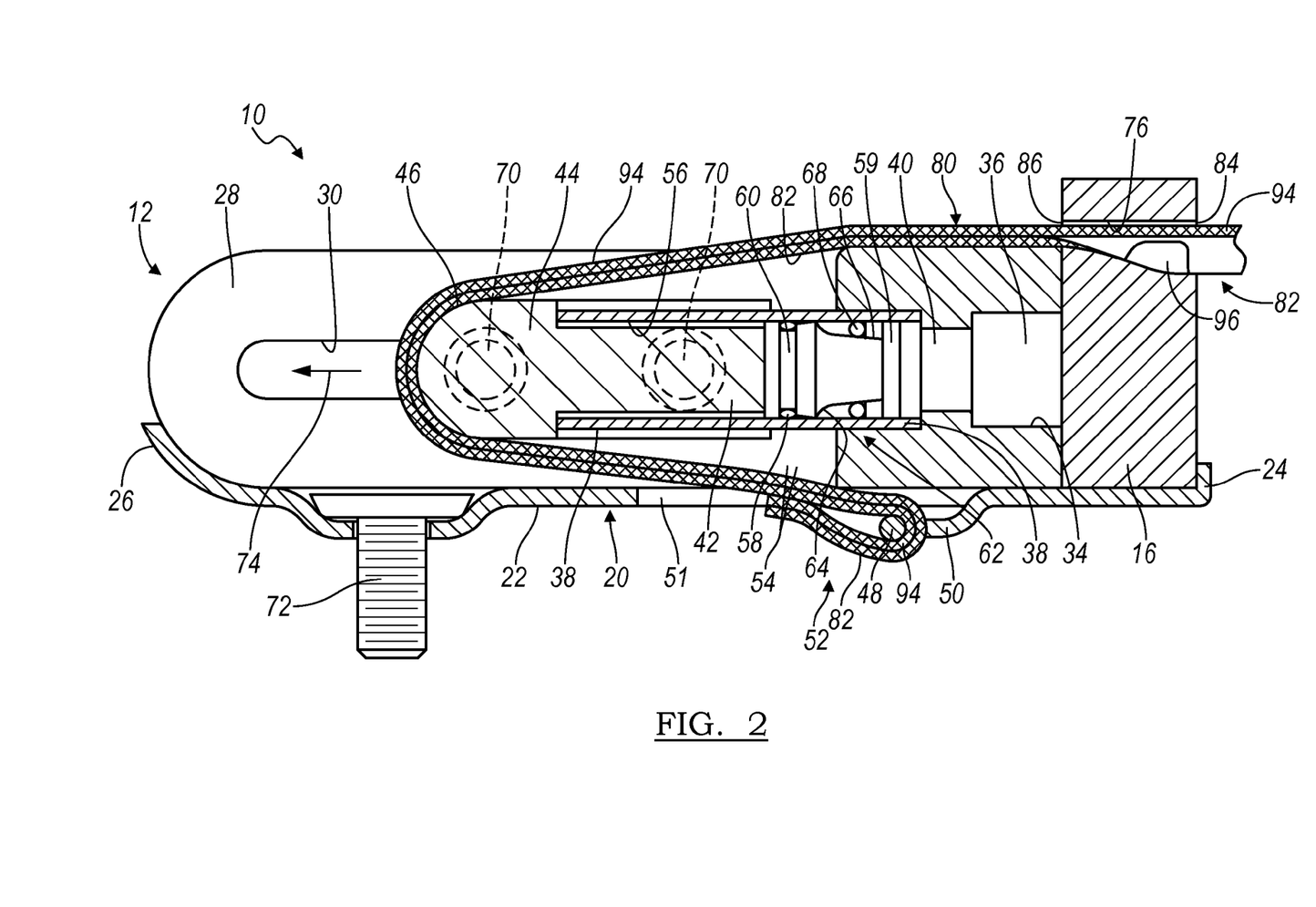
FIG. 2 is a side sectional view, generally taken along line 2-2 in FIG. 1, of the pretensioner in a pre-activation position.
Figure 3:
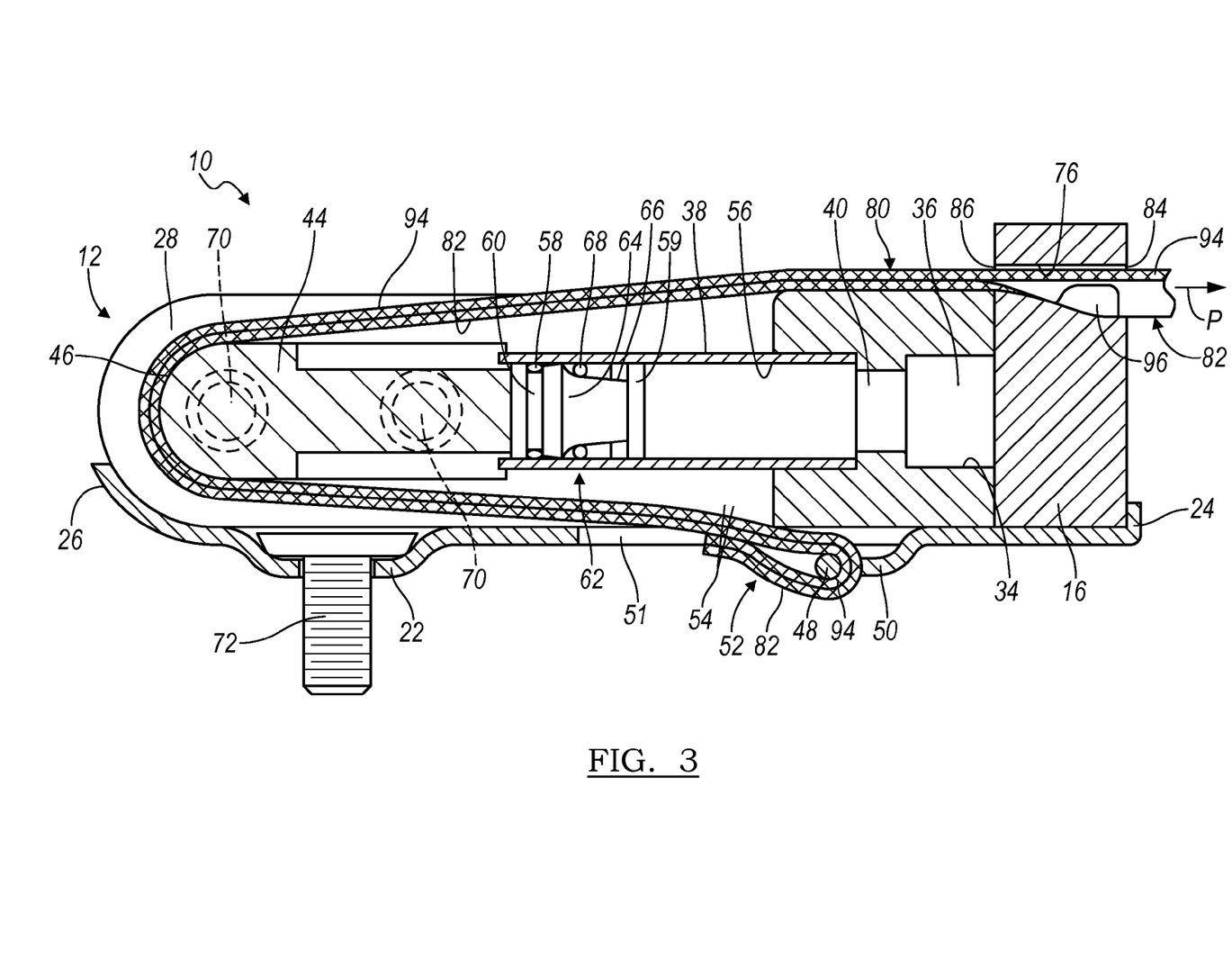
FIG. 3 is a cross-sectional view, similar to FIG. 2, of the pretensioner in a post-activation position.

The actuating profile 44 redirects the seatbelt webbing 18 received within the pretensioning 10 by an angle in the range of 160° to 180°. The webbing 18 thus enters the pretensioner 10 in a first direction, through the webbing guide 16, and is guided around the actuating profile 44 and leaves in a second direction that is nearly opposite to the first direction. Generally towards the interface of the long leg 22 with the short leg 24, the webbing 18 is fastened about an attachment bar 48 defined by a tongue 50, which is formed by a slightly, outwardly bent portion of the long leg 22 of the base plate 20. The webbing 18 extends through an opening 51, defined in the base plate 20 about the tongue 50, and is secured to the attachment bar 48 with a loop 52 formed from an end of the webbing 18 that has been folded back upon itself and sewn, stitched or otherwise fastened together. As illustrated in FIGS. 2 and 3, this fastening of the webbing 18 to form the loop 52 is shown as utilizing stitching 54.

Within the cylinder 38, the piston 42 is sealed against the interior cylinder wall 56 with an elastomeric O-ring 58 located within an annular groove 60 and extending about the piston 42. Between the O-ring 58 and a head 59 of the piston 42 is a one-way clutch assembly 62. Clutch assembly 62 includes a conical portion 64 and an annular portion 66 about which a plurality of balls or BBs 68 is arranged. The BBs 68 are dimensioned to allow for movement when located about the annular portion 66, but to cause the BBs 68 to be wedged between the cylinder wall 56 and the conical portion 64 upon a force acting on the piston 42 to move it in the retracted direction, which is towards the micro-gas generator 36.

As previously mentioned, the piston 42 is guided in the axial direction by the slots 30 formed in the sidewalls 28. The piston 42 interfaces with the slots 30 by the formation of buttons or other protrusions 70, shown in phantom, extending outwardly from the actuating profile 44 through the slots 30.

In order to mount the pretensioner 10 to the vehicle, an anchor bolt 72 extends through a mounting hole 74 defined in the long leg 22 of the frame 12.

FIG. 2 shows the pretensioner 10 in its pre-activation state. The pre-activation state is the normal state of the pretensioner 10 and its state upon installation in the vehicle. Upon a triggering event, such as sudden deceleration of the vehicle indicating and impending collision or actual impact to the vehicle, an electrical firing signal is sent to the micro-gas generator 36 causing the micro-gas generator 36 to ignite and expel expansion gas into the passageway 40 of the cylinder 38. The expansion gas exerts a pressure within passageway 40 of the cylinder 38 that acts upon the head 59 of the piston 42. This pressure causes movement of the piston 42, along the cylinder 38 in a direction generally away from the micro-gas generator 36, into its post-activation state. The post-activation state is illustrated in FIG. 3.

The axial movement of the piston 42 is opposed by a pulling force or resistance of the seatbelt webbing 18. At some point, the opposing force on the piston may be strong enough that the piston 42 is unable to further pull the webbing 18 in the direction indicated by arrow 74. Absent a force strong enough to stop movement of the piston 42, movement of the piston 42 is limited by the engagement of the button 70 with the end of the slot 30. This signifies the maximum possible stroke of the piston 42. Because the webbing 18 extends around the activating profile 44, the webbing 18 has been pulled into the pretensioning 10 by a length corresponding to approximately twice the stroke of the piston 42. This construction allows for the pretensioner 10 to have a reduced overall length.

During the axial movement out of the cylinder 32, the balls 70 move along with the piston 40. When a pulling force P acts on the seat belt webbing 38 opposite to the direction 46, the BBs 68 move up onto the conical portion 64, thereby wedging the BBs 68 between the conical portion 64 and the inner cylinder wall 56. Through this interaction, the conical portion 64 and the BBs 68 form the one-way clutch assembly 62, stopping any further reverse movement of the piston 42 toward the micro-gas generator 36. This one-way clutch assembly ensures that the pretensioning action on the seatbelt webbing 18 is maintained.

As the webbing 18 is pulled into the pretensioner 10 during activation, the webbing 18 passes through an opening 76 defined in the webbing guide 16. The opening 76 is shaped so as to manipulate the webbing 18 as it passes through the webbing guide 16 resulting in the webbing 18 being transitioned from a full width configuration 78 into a reduced width configuration 80. As seen in FIG. 1, both lateral sides 82 of the webbing 18 are folded as the webbing 18 passes through the webbing guide 16. This is achieved by the webbing guide seen in FIGS. 4 and 5. In an alternative configuration of the webbing guide, the webbing may be folded only along one lateral side. A webbing guide facilitating the folding on one side of the webbing is shown and discussed in connection with FIG. 6.

It is noted that in the pre-activation state, the webbing 18 located within the pretensioner 10 exhibits the reduced width configuration 80. This is seen in FIGS. 1-3. Thus, as the webbing 18 proceeds over the actuating profile 44 and about the end surface 46 thereof, the webbing 18 exhibits a thickness that is twice the thickness exhibited by the webbing 18 in its in full width configuration 78. The double thickness is therefore formed by the thickness of the central portion 94 plus the thickness of the lateral sides 82 of the webbing 18.

Figure 4:
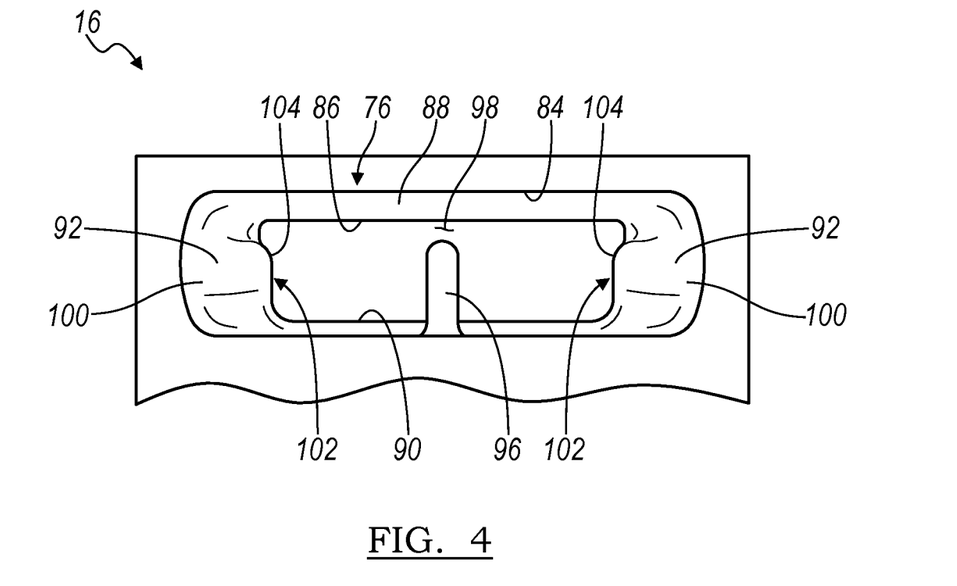
FIG. 4 is a front end view of a seatbelt webbing guide utilized with the pretensioner seen in FIG. 1.
Figure 5:
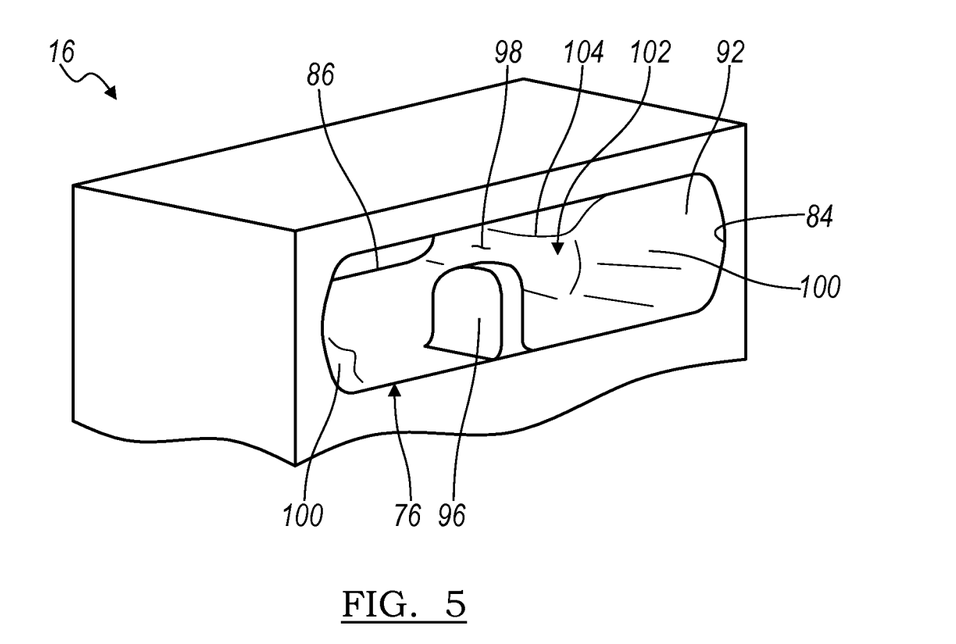
FIG. 5 is a perspective view of the seatbelt webbing guide of FIG. 4.

Referring now to FIGS. 4 and 5, as seen therein, the opening 76 of the webbing guide 16 is generally symmetrical and defines a flattened, funnel shape that progresses from the entrance 84 of the guide 16 to the exit 86. As the opening 76 proceeds from the entrance 84 to the exit 86, the funnel shape of the opening 76 reduces in width. As such, the area defined by the entrance 84 (the entrance area) is larger than the area defined by the exit 86 (the exit area).

The upper and lower walls 88, 90 of the opening 76 are generally flat, while the sidewalls 92 exhibit features that cause the lateral sides 82 of the webbing 18 to be folded underneath a central portion 94 of the webbing 18. The lower wall 90, while being generally flat, includes an upwardly extending projection or fin 96. The fin 96 is located in the center of the lower wall 90 and extends to a height that defines a gap 98 between the top of the fin 96 and the upper wall 88 that is at least slightly larger the thickness of the webbing 18. As the webbing 18 passes through the opening 76, the central portion 94 of the webbing 18 will travel through the gap 98 between the upper wall 88 and the top of the fin 96. By positioning the fin 96 in a center of the lower wall 90, the fin 96 ensures that as the lateral sides 82 of the webbing 18 are folded, they are symmetrically folded to about a center of the full width configuration 78. The fin 96 also serves the purpose of avoiding the possibility that the webbing 18 will become misaligned or improperly twisted as it progresses through the opening 76 over the course of the life of the vehicle and prior to any activation of the pretensioner 10.

The sidewalls 92 of the opening 76 vary in shape along their length. Immediately adjacent to the entrance 84, the sidewalls define a curved mouth 100, the curvature of which is uninterrupted by any significant changes in curvature from the upper wall 88 to the lower wall 90. Thus, the mouths 100 of the sidewalls 92 exhibit a substantially constant curvature from the upper wall 88 to the lower wall 90. The surfaces of the mouths 100 generally taper toward one another such that, at the entrance 84, the mouths 100 define their greatest width between each other, which thereafter decreases in the direction of the exit 86.

Partially through the length of the opening 76, the sidewalls 92 transition from the continuous curves of the mouths 100 into shoulder regions 102, which thereafter extend to the exit 86. The shoulder regions 102 include shoulders 104 that are formed as projections or raised portions along the lower part of the sidewalls 92 (the part of the sidewall 92 adjacent to the lower wall 90). The upper parts of the opposing shoulder regions 102 therefore exhibit a greater width than lower parts of the opposing shoulder regions 102. Over the length of the opening 76, the opposing shoulder regions 102 also taper toward one another, similar to the tapering of the mouths 100. The tapering of the mouths 100 and the shoulder regions 102 further help define the overall funnel shape of the opening 76.

With this construction of the opening 76, as the webbing 18 is pulled through the opening 76, the shoulders 102 and the overall flattened funnel shape of the opening 76 cause the lateral sides 82 of the webbing 18 to be progressively folded under the central portion 94 of the webbing 18.

Figure 6:
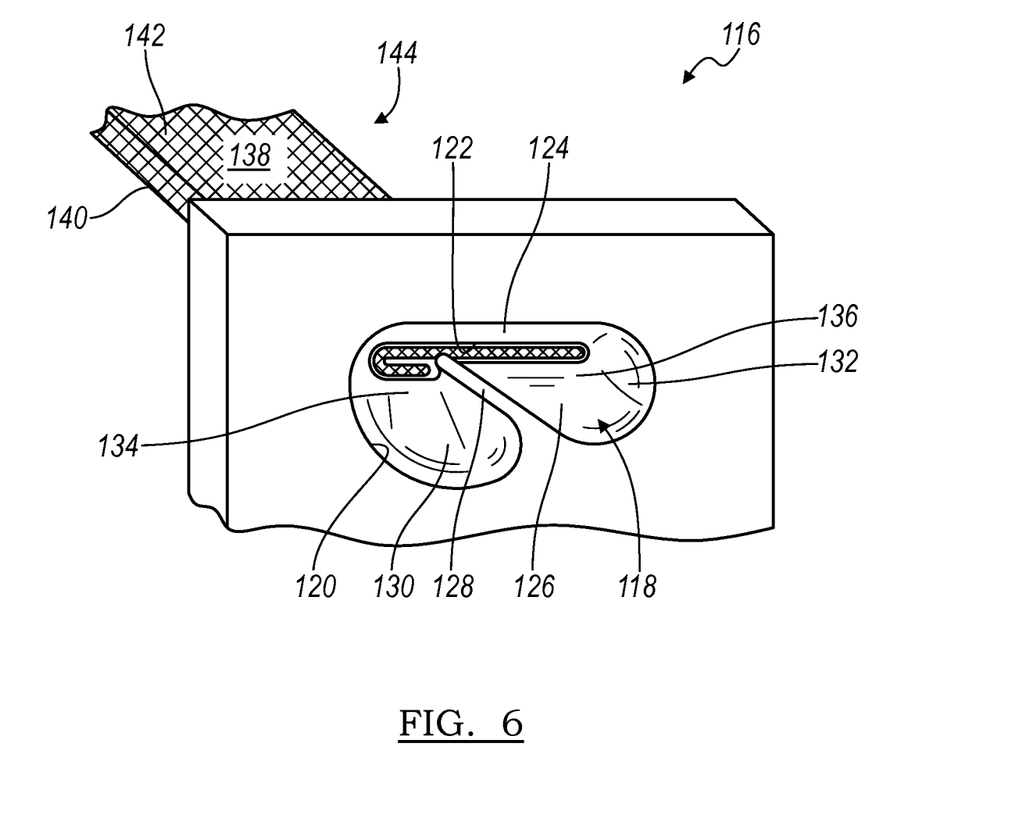
FIG. 6 is a perspective view of an additional embodiment of a seatbelt webbing guide for use with the pretensioner seen in FIG. 1.

Referring now to FIG. 6, a second embodiment of the webbing guide 116 is illustrated therein. As seen therein, the webbing guide 116 includes an opening 118 that is asymmetrical in its construction, defines a general funnel shape and has an entrance area that is greater than it is exit area. More specifically, the opening 118 proceeds from an entrance 120 to an exit 122 and includes an upper wall 124 that is substantially flattened. The lower wall 126 is divided by an upward projection or fin 128 that extends obliquely from the lower wall 126.

On opposite sides of the fin 128, the entrance 122 exhibits differently sized openings. With the orientation of the webbing guide 116 in FIG. 6 as a reference, it is seen that the left side 130 of the entrance 120 is larger than the right side 132 of the entrance 120. Similarly, the left side 134 of the exit 122 is larger than the right side 136 of the exit 122. The previously mentioned fin 128 extends obliquely in the direction of the larger side of the opening 118, which is the left side in FIG. 6. The left side of the opening 118 also narrows in width as it proceeds to the exit 122.

As a result, webbing 138 on the left side of the opening has its corresponding left lateral side 140 initially rolled under its central portion 142 as it is pulled through the opening 118. This results in the webbing 138 being transferred out of the exit 122 in a reduced width configuration 144 wherein only one lateral side 140 of the webbing 138 is folded under central portion 94.

While the above description constitutes the preferred embodiment of the present invention, it will be appreciated that the invention is susceptible to modification, variation, and change without departing from the proper scope and fair meaning of the accompanying claims.

We claim:

1. A guide for passing a webbing therethrough and folding a lateral side of the webbing back upon a central portion of the webbing to produce a reduced width in the webbing, the reduced width being smaller than an unfolded full width of the webbing, the guide comprising:

a body having an enclosed passageway defined therethrough from an entrance orifice on one side of the body to an exit orifice on an opposing side of the body, the passageway defined by interior surfaces extending between the entrance orifice and the exit orifice, the interior surfaces defining a shape wherein the entrance orifice has an entrance width and height that are larger than an exit width and height defined by the exit orifice, the entrance width and the exit width being defined in the direction of the width of the webbing, the passageway being shaped to fold the webbing from the full width to the reduced width.

2. The guide according to claim 1, wherein the passageway includes an upper wall, a lower wall and opposed sidewalls generally forming a flattened funnel shape proceeding from the entrance orifice to the exit orifice.

3. The guide according to claim 2, wherein the opposed side walls are symmetrically shaped.

4. The guide according to claim 2, wherein the lower wall is formed with a single central fin projecting toward the upper wall.

5. The guide according to claim 4, wherein the central fin extends perpendicularly relative to the lower wall.

6. The guide according to claim 4, wherein the central fin extends obliquely relative to the lower wall.

7. The guide according to claim 1, wherein the passageway defines a funnel shape from the entrance orifice to the exit orifice.

8. The guide according to claim 1, wherein the passageway defines a flattened funnel shape from the entrance orifice to the exit orifice.

9. A guide according to claim 1 incorporated in a pretensioner of a motor vehicle belt restraint system, the belt restraint system being of the type mountable to a structure of the motor vehicle and acting on a seatbelt, the pretensioner further comprising:

a frame having walls defining an interior compartment;

a piston assembly located within the interior compartment, the piston assembly including a gas generator in communication with the piston, the gas generator being fixedly positioned relative to the frame and the piston being movably mounted with respect to the frame, whereby an expanding gas created by the gas generator causes movement of the piston; and the guide being mounted to the frame and oriented such that the exit orifice faces toward the piston assembly and the entrance orifice faces away from the piston assembly.

10. The pretensioner according to claim 1, wherein the passageway of the seatbelt guide includes an upper wall, a lower wall and opposed sidewalls generally forming a flattened funnel shape proceeding from the entrance orifice to the exit orifice, the lower wall having a projection extending upward toward the upper wall and the projection extending one of perpendicularly or obliquely relative to the lower wall.

11. The pretensioner according to claim 10, wherein the opposed side walls are one of asymmetrically or symmetrically shaped.

12. A guide for passing a webbing therethrough and folding a lateral side of the webbing back upon a central portion of the webbing, the guide comprising:
  a body having an opening defined therethrough from an entrance on one side of the body to an exit on an opposing side of the body, the opening defined by interior surfaces extending between the entrance and the exit, the interior surfaces defining a shape wherein the entrance has an entrance area that is larger than an exit area defined by the exit, the opening including an upper wall, a lower wall and opposed sidewalls generally forming a flattened funnel shape proceeding from the entrance to the exit, and wherein the opposed side walls are asymmetrically shaped.

13. A guide for passing a webbing therethrough and folding a lateral side of the webbing back upon a central portion of the webbing, the guide comprising:
  a body having an opening defined therethrough from an entrance on one side of the body to an exit on an opposing side of the body, the opening defined by interior surfaces extending between the entrance and the exit, the interior surfaces defining a shape wherein the entrance has an entrance area that is larger than an exit area defined by the exit, the opening including an upper wall, a lower wall and opposed sidewalls generally forming a flattened funnel shape proceeding from the entrance to the exit, wherein the opposed sidewalls are symmetrically shaped, and wherein the opposed sidewalls include shoulders formed therein, the shoulders extending longitudinally in the opening toward the exit, the shoulders defining a reduced region between the opposed sidewalls.

14. The guide according to claim 13, wherein portions of the sidewalls that are immediately adjacent to the entrance are formed without shoulders.

15. A pretensioner for use as part of a motor vehicle belt restraint system, the belt restraint system being of the type mountable to a structure of the motor vehicle, the pretensioner comprising:
  a frame having walls defining an interior compartment;
  a piston assembly located within the interior compartment, the piston assembly including a gas generator in communication with the piston, the gas generator being fixedly positioned relative to the frame and the piston being movably mounted with respect to the frame, whereby an expanding gas created by the gas generator causes movement of the piston;
  a seatbelt guide mounted to the frame, the seatbelt guide including an enclosed passageway defined therethrough from an entrance orifice to an exit orifice on opposite sides of the seatbelt guide, the passageway having interior surfaces extending between the entrance orifice and the exit orifice, the interior surfaces defining a shape wherein the entrance orifice defines an entrance width and height that are larger than an exit width and height defined by the exit orifice; and
  a seatbelt extending into the entrance orifice through the passageway and out of the exit orifice of the seatbelt guide, the seatbelt extending about the piston, the seatbelt further having a first width before extending into the entrance orifice and having a second width after extending out of the exit orifice, the second width being less than the first width, the entrance width and the exit width being defined in the direction of the first width of the seatbelt, the seatbelt being guided along a path from the exit orifice around a semi-cylindrical end surface while maintaining the second width along the path.

16. The pretensioner according to claim 15, wherein a lateral side of the seatbelt is folded under a central portion of the seatbelt where the seatbelt extends out of the exit orifice.

17. The pretensioner according to claim 15, wherein at least a portion of the seatbelt is folded back upon itself as it extends about the piston.

18. The pretensioner according to claim 15, wherein the passageway defines one of a funnel shape or a flattened funnel shape.

19. A pretensioner for use as part of a motor vehicle belt restraint system, the belt restraint system being of the type mountable to a structure of the motor vehicle, the pretensioner comprising:
  a frame having walls defining an interior compartment;
  a piston assembly located within the interior compartment, the piston assembly including a gas generator in communication with the piston, the gas generator being fixedly positioned relative to the frame and the piston being movably mounted with respect to the frame, whereby an expanding gas created by the gas generator causes movement of the piston;
  a seatbelt guide mounted to the frame, the seatbelt guide including an opening defined therethrough from an entrance to an exit on opposite sides of the seatbelt guide, the opening having interior surfaces extending between the entrance and the exit, the interior surfaces defining a shape wherein the entrance defines an entrance area that is larger than an exit area defined by the exit;
  a seatbelt extending into the entrance through the opening and out of the exit of the seatbelt guide, the seatbelt extending about the piston, the seatbelt further having a first width before extending into the entrance and having a second width after extending out of the exit, the second width being less than the first width;
  the opening of the seatbelt guide including an upper wall, a lower wall and opposed sidewalls generally forming a flattened funnel shape proceeding from the entrance to the exit, the lower wall having a projection extending upward toward the upper wall and the projection extending one of perpendicularly or obliquely relative to the lower wall, wherein the opposed sidewalls include shoulders formed therein and extending longitudinally in the opening, the shoulders defining a reduced region between the opposed sidewalls.

20. The pretensioner according to claim 19, wherein adjacent to the entrance the opposed side walls include portions formed without shoulders.

* * * * *